United States Patent [19]

Koberstein et al.

[11] 3,867,345
[45] Feb. 18, 1975

[54] METHOD FOR THE OXIDIZING ALPHA, BETA-UNSATURATED ALDEHYDES TO ALPHA, BETA-UNSATURATED CARBOXYLIC ACIDS

[75] Inventors: Edgar Koberstein, Alzenau; Theodor Lüessling, Grossauheim; Ewald Noll, Grosskrotzenburg; Hans Schaefer, Grossauheim; Wolfgang Weigert, Offenbach, all of Germany

[73] Assignee: Deutsche Gold-Und-Silber-Scheideanstalt vormals Roessler, Frankfurt am Main, Germany

[22] Filed: Sept. 27, 1972

[21] Appl. No.: 292,628

Related U.S. Application Data

[62] Division of Ser. No. 118,965, Feb. 25, 1971.

[30] Foreign Application Priority Data

Feb. 27, 1970 Germany............................ 2009172

[52] U.S. Cl................ 260/530 N, 252/456, 252/467
[51] Int. Cl......................... C07c 51/26, C07c 57/04
[58] Field of Search................................ 260/530 N

[56] References Cited
UNITED STATES PATENTS

| | | | |
|---|---|---|---|
| 3,567,773 | 3/1971 | Yamguchi...................... | 260/530 N |
| 3,574,729 | 4/1971 | Gasson........................... | 260/530 N |
| 3,579,574 | 5/1971 | Van Der Meer................ | 260/530 N |
| 3,595,911 | 7/1971 | Ball................................ | 260/530 N |

FOREIGN PATENTS OR APPLICATIONS

| | | | |
|---|---|---|---|
| 903,034 | 8/1962 | Great Britain.................. | 260/530 N |
| 1,007,353 | 10/1965 | Great Britain.................. | 260/530 N |

*Primary Examiner*—Lorraine A. Weinberger
*Assistant Examiner*—Richard D. Kelly
*Attorney, Agent, or Firm*—Michael S. Striker

[57] ABSTRACT

$\alpha,\beta$-unsaturated aldehydes are oxidized to $\alpha,\beta$-unsaturated carboxylic acids by contacting the $\alpha,\beta$-unsaturated aldehyde with air or oxygen and steam at 200°–350°C and at atmospheric or elevated pressure in the presence of a catalyst so as to convert the aldehyde to the corresponding carboxylic acid. The catalyst comprises a mixture of oxides of the elements antimony, molybdenum, vanadium and tungsten and/or compounds of said elements and oxygen wherein the atomic ratio of the elements is as follows: 1 to 60 : 12 : 0.5 to 25 : 0.1 to 12.

The catalyst is made by intimately mixing under agitation aqueous solutions or suspensions of the oxides or other compounds, for instance antimony oxide, ammonium molybdate, ammonium vanadate and ammonium tungstate, and possibly a carrier material and preferably bringing the mixture to boiling point, then separating the catalyst mass from the aqueous phase, drying it and calcining it at 225°–275°C, followed by heating in air for 15–60 minutes at 350°–475°C.

9 Claims, No Drawings

METHOD FOR THE OXIDIZING ALPHA, BETA-UNSATURATED ALDEHYDES TO ALPHA, BETA-UNSATURATED CARBOXYLIC ACIDS

CROSS-REFERENCE TO RELATED APPLICATIONS

The present application is a division of Application Ser. No. 118,965 filed on February 25, 1971 in respect of "Catalyst for the Oxidation of α, β-Unsaturated Aldehydes to α, β-Unsaturated Carboxylic Acids and Process of Making and Using the Same".

BACKGROUND OF THE INVENTION

The invention relates to the oxidation of α, β-unsaturated aldehydes to the corresponding α, β-unsaturated carboxylic acids and particularly to the oxidation of acrolein and methacrolein, respectively, to acrylic acid and methacrylic acid, respectively.

Many different process are known for the oxidation of α, β-unsaturated aldehydes. They are distinguished mainly by different reaction conditions, particularly by the use of different catalysts. Normally oxides are used as catalysts for elements which occur in several oxidation stages, such as the oxides of vanadium, molybdenum, etc. Usually the oxides are used on a carrier material of silicon dioxide or aluminum oxide.

Only a few of the known processes and catalysts are useful for industrial practice, that is, permit large conversions and high yield of acrylic acid at a comparatively short residence time. For instance, in the British specification No. 903,034 there were disclosed, among others, molybdenum-antimony, molybdenum-tungsten- and molybdenum-vandium oxide catalysts which convert acrolein to acrylic acid. These catalyst, however, permit only comparatively small yields of acrylic acid. Somewhat better is a catalyst disclosed in Belgian Pat. No. 698,273 which contains molybdenum-, vanadium- and tungsten oxide.

However, it has been found that the yields of acrylic acid obtainable with these catalysts are not sufficient for industrial production purposes. The conversion figures for acrolein obtainable in industrial practices especially for extended periods of time are rather limited in these processes.

It is therefore the object of the present invention to provide for an economical and industrially acceptable oxidation process, which furthermore maintains a uniformly high activity for an extended period of time and permits obtaining a performance which is of interest for large-scale productions.

SUMMARY OF THE INVENTION

The carboxylic acids are made by contacting the α, β-unsaturatted aldehyde at atmospheric or elevated pressure and 200°–350°C with air or oxygen and steam in the presence of a catalyst comprising a mixture of oxides of the elements antimony, molybdenum, vanadium and tungsten and/or compounds of said elements and oxygen wherein the atomic ratio of the said elements is 1 to 60 : 12 : 0.5 to 25 : 0.1 to 12 and thus oxidizing the α, β-unsaturated aldehyde to the corresponding α,β-unsaturated carboxylic acid.

DETAILED DESCRIPTION OF THE INVENTION AND OF PREFERRED EMBODIMENTS

The preferred atomic ratio in the catalyst between antimony, molybdenum, vanadium and tungsten is 3 to 40 : 12 : 1 to 12 : 0.1 to 6. Still more preferred is a ratio as follows: 3 to 15 : 12 : 1 to 8 : 0.5 to 3.

The catalyst can be used as such. However, it is preferred to employ the catalyst on a carrier material or in mixture with a carrier material. Carrier materials may for instance be aluminum oxide, silicon dioxide or any other conventional carrier. Preferred is the use of highly dispersed silicon dioxide and in particular mixtures of highly dispersed silicon dioxide and montmorillonite. The activity of the catalyst can be modified in a predetermined manner by adjusting the amount ratio between catalyst and carrier material and particularly also the ratio between silicon dioxide and montomorillonite. It has been found to be advantageous to heat the montmorillonite prior to mixing it with the silicon dioxide for about 5 hours to between 900° and 1200°C. This heating operation may be effected after treatment of the montmorillonite with an acid, preferably a mineral acid, and particularly hydrochloric acid, nitric acid, phosphoric acid or sulfuric acid.

These steps permit obtaining the catalyst with exactly the desired activity which is of great significance for industrial practice. The conventional tubular fixed bed reactors can thus be loaded with several layers of catalyst of different but predetermined activites. It is thus possible to cause the reaction to take place in a uniform manner along the entire length of the reactor tubes. Localized temperature peaks which result in side reactions, for instance in combustion of the desired products to form carbon monoxide, carbon dioxide and water are thus avoided. The activity of the catalyst is preserved for a long period of time and the same is true of the differentiation of activity. The catalysts of the invention can also be used in fluid bed reactors.

A further differentiation of the activity is obtained after completion of the making of the catalyst by causing the catalyst to adopt a structure formed by heating in a slightly reducing or inert gas current. Preferred for this purpose is a nitrogen atmosphere and a heating to temperatures between 425° and 600°C, preferably between 500° and 550°C.

The antimony-molybdenum-vanadium-tungsten oxide catalyst is made preferably in the following manner. Aqeuous solutions or suspensions, for instance of antimony oxide, ammonium molybdate, ammonium metavanadate, and ammonium tungstate, and possibly a carrier material are subjected to heating and vigorous stirring. preferably the heating is carried to boiling point temperature. For the making of the catalyst a pH from 2 to 7 in the aqueous mixture is desirable. The catalyst mass is then separated from the aqueous phase and dried and thereafter calcined at 225°–275°C, preferably at about 250°C, whereupon it is subjected to a heating in air for 15–60 minutes, preferably for 15–25 minutes, to a temperature between 350° and 475°C. Preferably the heating is carried to a temperature between 400° and 475°C, such as about 450°C.

Instead of the specific compounds mentioned, it is possible also to use other compounds of the named catalytically effective elements, provided that they are subject to thermal decomposition in a similar manner.

The antimony oxide used in the catalyst may be subjected to a pretreatment with nitric acid.

The carrier material may be highly dispersed silicon dioxide and preferably a mixture of highly dispersed silicon dioxide and finely ground montmorillonite. The latter is preferably heated to between 900° and 1200°C prior to mixing it with the silicon dioxide.

The montmorillonite can also be subjected to a pretreatment prior to said heating step with an acid, particularly hydrochloric acid, nitric acid, phosphoric acid or sulfuric acid.

As already mentioned, a further differentiation of the activity of the catalyst is possible by subjecting the catalyst to an aftertreatment. This aftertreatment consists in heating the catalyst to between 425° and 600°C, preferably between 500° and 550°C in a slightly reducing or preferably inert atmosphere. Most preferred is the use of a nitrogen atmosphere.

The catalyst is preferably used in the form of shaped products which are formed from the pre-calcined catalyst mass (calcining temperature between 225° and 275°C, preferably at about 250°C) in conventional pelleting or extrusion devices. The shaping may be carried out after grinding of the catalyst and adding thereto the usual additives for carrying out a pressure shaping operation.

In the invention $\alpha,\beta$-unsaturated aldehydes are oxidized in the presence of the described catalyst to $\alpha,\beta$-unsaturated carboxylic acids, the reaction being carried out in the vapor phase. The invention is particularly applicable to the use of the catalyst for the oxidation of acrolein and methacrolein to acrylic acid and methacrylic acid, respectively.

The process of the invention is distinguished from prior-art processes by the very high yield and surprisingly, furthermore, by the fact that the catalysts do not undergo any change in activity, even after operation for several weeks. All this notwithstanding, the catalysts have an excellent selectivity for the oxidation of specific $\alpha,\beta$-unsaturated aldehydes to specific $\alpha,\beta$-unsaturated carboxylic acids. For instance acrolein can be converted to acrylic acid with yields in excess of 90 percent.

The catalysts of the invention in industrial practice also permit obtaining very high performance figures. In an industrial reactor, for instance, a throughput of 4 mole acrolein per liter of catalyst per hour could be obtained without any difficulty.

The oxidation of the $\alpha,\beta$-unsaturated aldehydes to $\alpha,\beta$-unsaturated carboxylic acids is effected in conventional form by oxygen in the presence of water in the vapor phase.

The reaction conditions can be varied within a wide range. The reaction is preferably carried out without pressure or at only a low pressure up to 3 atmospheres and at a temperature between 200° and 350°C. The oxygen for the oxidation can be obtained from any desired source. Usually air is employed.

The amount ratios between $\alpha,\beta$-unsaturated aldehydes used as starting compound, air and water can be varied in a wide range. For instance, a molar ratio between $\alpha,\beta$-unsaturated aldehyde and air may be used of 1 : 2.5 and up to 1 : 30. Preferably the molar ratio is between 1 : 2.5 and 1 : 10. The molar ratio between $\alpha,\beta$-unsaturated aldehyde and water may be between 1 : 2 and 1 : 20, and preferably is between 1 : 5 and 1 : 10.

It is preferred to employ an input of the $\alpha,\beta$-unsaturated aldehyde between 0.5 and 10 and preferably between 1.5 per 8 moles per liter of catalyst and hour.

The following examples will further illustrate the invention. In these examples, the following terms have been employed:

Input of $\alpha, \beta$-insaturated aldehydes $$= \frac{\alpha, \beta\text{-unsaturated aldehyde starting product}}{\text{catalyst bulk volume} \cdot \text{time}} \cdot [\text{mol/l.h}]$$

Conversion $$= \frac{\text{moles of reacted } \alpha, \beta\text{-unsaturated aldehyde}}{\text{moles of initial } \alpha, \beta\text{-unsaturated aldehyde}} \cdot 100 [\%]$$

Yield $$= \frac{\text{moles of final reaction product}}{\text{moles of initial } \alpha, \beta\text{-unsaturated aldehyde}} \cdot 100 [\%]$$

EXAMPLE 1

87.5 g of antimony (III) oxide ($Sb_2O_3$) and 200 ml conc. nitric acid were stirred together and heated at the boiling point of the mixture until the discharge of nitrous gases had stopped. The mass was then removed by suction and washed with water. 212 g of ammonium heptamolydate [$(NH_4)_6Mo_7O_{24} \cdot 4H_2O$] were dissolved in 3.5 l water at a temperature below 50°C. To this solution there were then added while stirring the pretreated antimony oxide, 213 g of highly dispersed silicon dioxide (for instance the market product "Aerosil 200"), 35.1 g of ammonium monovanadate ($NH_4VO_3$) dissolved in 1 liter of hot water and 30.4 g of ammonium dodecatungstate [$(NH_4)_{10}W_{12}O_{41}$] suspended in 50 ml of hot water. The mixture was brought up to a pH of 3 by adding nitric acid and was heated and stirred at boiling point during 2 hours. Most of the water than was removed from the mixture on a roller drier whereupon the mixture was heated for 20 minutes in air to 250°C, then cooled and compressed to tablets of 5 mm diameter after adding 3 percent by weight of graphite powder. The pressed pellets were subsequently heated in a rotary furnace to 450°C while exposed to air. The residence time in the furnace was about 20 minutes.

The catalyst accordingly contained antimony, molybdenum, vanadium and tungsten in a molar ratio of 6 : 12 : 3 : 1.2 and in addition contained highly dispersed $SiO_2$ as carrier material.

75 ml of the catalyst were then placed in a solid bed reactor of non-corrosive steel of an inner diameter of 20 mm and a length of 410 mm. The reactor was heated to 252°C by means of a salt bath. At this temperature a gas mixture was passed across the catalyst charge of acrolein, air and steam at a molar ratio of 1 : 10 : 5. The input of acrolein was 2.65 moles/liter-hour. The amount of reacted acrolein was 97 percent and the acrylic acid yield was 90 percent.

EXAMPLE 2

700 g of antimony (III) oxide ($Sb_2O_3$) and 1.4 l concentrated nitric acid were stirred together and heated at the boiling point of the mixture until no further discharge of nitrous gases occurred. The mass was then removed by suction and washed with water. 1695 g of ammonium heptamolybdate [$(NH_4)_6Mo_7O_{24} \cdot 4H_2O$] were dissolved in 28 l of water at a temperature below 50°C. To this solution there were added under stirring the pretreated antimony oxide, 697 g of highly dispersed silicon dioxide powder (for instance in form of the commercial product "Aerosil 200"), 1,100 g of finely dispersed montmorillonite which had been subjected to a prior heating for 5 hours to 1,000°C, 281 g of ammonium monovanadate ($NH_4VO_3$) dissolved in 7 l of hot water and 243 g of ammonium dodecatungstate [$(NH_4)_{10}W_{12}O_{41}$] suspended in 400 ml water. The pH of the mixture was adjusted to a pH of 3 by adding nitric acid and was then heated to boiling point and stirred for 2 hours. Subsequently most of the water was removed from the mixture on a roller drier whereupon the mixture was heated in air for 20 minutes at 250°C, cooled and finally compressed to tablets of 5 mm diameter after adding 3 percent by weight of graphite powder. The compressed pellets were subsequently heated in a rotary furnace to 450°C while exposed to air. The residence time in the furnace was about 20 minutes.

The catalyst accordingly contained antimony, molybdenum, vanadium and tungsten in a molar ratio of 6 : 12 : 3 : 1.2 together with a mixture of "Aerosil" and montomorillonite as carrier material.

The catalyst was then used as described in Example 1. The temperature of the salt bath was 265°C. At this temperature all of the input of acrolein was reacted and acrylic acid was obtained with a yield of 90 percent.

EXAMPLE 3

The same procedure was used as in Example 2. However, in making the catalyst there were used 1,610 g of montmonorillonite and 1,010 g of highly dispersed silicon dioxide.

This catalyst resulted in reaction only of 50 percent acrolein at a salt bath temperature of 269°C. The yield of acrylic acid was 46 percent.

EXAMPLE 4

A reactor of an internal diameter of 25 mm and a length of 3.1 m was charged with a layer of a thickness of 1.5 m of a catalyst made according to Example 2. On top of it a layer of 1 m thickness of the catalyst of Example 3 was placed and above it another layer of a height of one-half meter of the catalyst of Example 2. Across this catalyst a gas mixture of acrolein, air and steam was passed in a molar ratio of 1 : 7 : 8 at a salt bath temperature of 300°C.

The acrolein input was 4.0 mole/liter-hour. The acrolein was reacted at 100 percent and the yield of acrylic acid was 92.7 percent.

After an operation for 1,000 hours, the acrolein conversion and the acid yield were still the same.

EXAMPLE 5

100 ml of the catalyst of Example 2 were heated under pure nitrogen to 550°C. They were left for 2 hours at this temperature in the nitrogen atmosphere and finally cooled while still under nitrogen to a temperature below 200°C. The remaining procedure was as in Example 1.

At a salt bath temperature of 359°C reaction of the initial acrolein was obtained at 63.5 percent while the yield of acrylic acid was 59.5 percent.

EXAMPLE 6

The same method was used in this example as in Example 1. However, the initial mixture for forming the catalyst comprises 97.3 g antimony (III) oxide ($Sb_2O_3$), 176.6 ammonium heptamolybdate [$(NH_4)_6Mo_7O_{24} \cdot 4H_2O$], 29.2 g ammonium monovanadate ($NH_4VO_3$), 25.4 g of ammonium dodecatungstate [$(NH_4)_{10}W_{12}O_{41}$], and 194 g of a highly dispersed silicon dioxide powder. The molar relation in this catalyst of antimony, molybdenum, vanadium and tungsten was 8 : 12 : 3 : 1,2 with metal compounds disposed on silicon dioxide as the carrier material.

At a salt bath temperature of 260°C the initial acrolein was reacted at 92 percent and the yield of acrylic acid was 75.5 percent.

EXAMPLE 7

The same method was used as in Example 1, except that the mixture for forming the catalyst comprised 175 g antimony (III) oxide ($Sb_2O_3$), 176 g ammonium heptamolybdate [$(NH_4)_6Mo_7O_{24} \cdot 4H_2O$], 29.2 g ammonium vanadate ($NH_4 VO_3$), 25,4 g ammonium dodecatungstate [$(NH_4)_{10}W_{12}O_{41}$] and 250 g of highly dispersed silicon dioxide powder. This catalyst accordingly contained antimony, molybdenum, vanadium and tungsten in a molar ratio of 14.4: 12 : 3 : 1,2 on silicon dioxide as a carrier material.

At a salt bath temperature of 295°C the initial acrolein was reacted at 93 percent. The yield of acrylic acid was 71 percent.

EXAMPLE 8

The method was the same as in Example 1. However, the initial mixture for making the catalyst comprised 43.7 g antimony (III) oxide ($Sb_2O_3$), 212.0 g ammonium heptamolybdate [$(NH_4)_6Mo_7O_{24} \cdot 4H_2O$], 35.1 g ammonium vanadate ($NH_4VO_3$), 30.4 g ammonium dodecatungstate [$(NH_4)_{10}W_{12}O_{41}$] and 183 g highly dispersed silicon dioxide powder. This catalyst accordingly contained antimony, molybdenum, vanadium and tungsten in a molar ratio of 3 : 12 : 3 : 1.2 on silicon dioxide as carrier material.

At a salt bath temperature of 252°C 93 percent of the initial acrolein was reacted and the yield of acrylic acid was 82.5 percent.

Without further analysis, the foregoing will so fully reveal the gist of the present invention that others can by applying current knowledge readily adapt it for various applications without omitting features that from the standpoint of prior art fairly consitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for the production of an unsaturated aliphatic carboxylic acid of the group consisting of acrylic acid and methacrylic acid which comprises passing a mixture of air or other gas containing molecular oxygen, steam, and an unsaturated aliphatic aldehyde of the group consisting of acrolein for the production of acrylic acid, and methacrolein for the production of methacrylic acid, into contact at a temperature between 200° and 350°C and at a pressure between atmospheric and a superatmospheric pressure of 3 atmospheres with a catalyst consisting essentially of oxides or oxygen-containing compounds of the elements antimony, molybdenum, vanadium, and tungsten, supported on a carrier material, the atomic ratios of the elements of the catalyst with respect to molybdenum being respectively between 1 : 12 and 60 : 12 for antimony, between 0.5 : 12 and 25 : 12 for vanadium, and between 0.1 : 12 and 12 : 12 for tungsten, and subsequently recovering the acrylic acid or methacrylic acid from the resulting mixture.

2. A process as defined in claim 1 in which the atomic ratios of the elements in the catalyst with respect to molybdenum are between 3 : 12 and 40 : 12 for antimony, between 1 : 12 and 12 : 12 for vanadium, and between 0.1 : 12 and 6.6 : 12 for tungsten.

3. A process as defined in claim 1 in which the atomic ratios of the elements in the catalyst with respect to molybdenum are between 3 : 12 and 5 : 12 for antimony, between 1 : 12 and 8 : 12 for vanadium, and between 0.5 : 12 and 3 : 12 for tungsten.

4. A process as defined in claim 1 in which the catalyst was prepared by a process comprising adding antimony oxide that had been heated together with nitric acid to a solution of a molybdenum salt in water, thereafter adding the carrier material, a solution of a vanadium salt and a dispersion of a tungsten salt, to the said mixture and intimately mixing the same, drying the mixture and calcining it in air at a temperature between 225° and 275°C, and subsequently heating the calcined mixture in air at a temperature between 350° and 475°C.

5. The process of claim 1 wherein the aldehyde is acrolein and the acid obtained is acrylic acid.

6. The process of claim 1, wherein the aldehyde is methacrolein and the acid obtained is methacrylic acid.

7. A process as defined in claim 1 in which the carrier material is highly dispersed silicon dioxide or a mixture of highly dispersed silicon dioxide and montmorillonite.

8. A process as defined in claim 1 in which the oxygen-containing gas is air and the aldehyde is acrolein and the molecular ratio of the mixture that is passed into contact with the catalyst is 1 mol of aldehyde to between 2.5 and 30 mols of air and between 2 and 20 mols of steam.

9. A process as defined in claim 8 in which the molecular ratio of the mixture is 1 mol of aldehyde to between 2.5 and 10 mols of air and between 5 and 10 mols of steam.

* * * * *